United States Patent [19]

Scheithauer et al.

[11] Patent Number: 4,623,534

[45] Date of Patent: Nov. 18, 1986

[54] METHOD FOR PRODUCING AMMONIUM PARATUNGSTATE

[75] Inventors: Richard A. Scheithauer; Clarence D. Vanderpool; Michael J. Miller, all of Towanda, Pa.

[73] Assignee: GTE Products Corporation, Stamford, Conn.

[21] Appl. No.: 714,327

[22] Filed: Mar. 21, 1985

[51] Int. Cl.[4] .............................................. C01G 41/00
[52] U.S. Cl. .................................................. 423/593
[58] Field of Search ........................................ 423/593

[56] References Cited

U.S. PATENT DOCUMENTS 3,052,516  9/1982  Drobnick et al. .................. 423/593

Primary Examiner—John Doll
Assistant Examiner—Wayne A. Langel
Attorney, Agent, or Firm—Donald R. Castle

[57] ABSTRACT

A method is disclosed for producing relatively pure ammonium paratungstate from an impure tungsten solution. The method involves first adding hexamethylenetetramine to the tungsten solution and adjusting the pH to from about 1.0 to about 2.0 with a mineral acid to form a first precipitate of a tungsten hexamethylenetetramine product, which is then separated from its mother liquor. The precipitate is then slurried in water and the pH adjusted to from about 7.0 to about 8.5 with ammonia to dissolve the precipitate. The resulting solution is then adjusted to from about 1.0 to about 2.0 with a mineral acid to form a second precipitate of the tungsten hexamethylenetetramine product which is then separated from its mother liquor. The second precipitate is then slurried in a solution of water and sufficient ammonia to form ammonium paratungstate which crystallizes out on evaporation of the slurry. The ammonium paratungstate is then separated from its mother liquor.

6 Claims, No Drawings

METHOD FOR PRODUCING AMMONIUM PARATUNGSTATE

FIELD OF THE INVENTION

This invention relates to a method for producing crystalline ammonium paratungstate from impure tungsten solutions. More particularly, it relates to a method for producing relatively pure ammonium paratungstate from impure tungsten solution by first forming a complex of tungsten hexamethylenetetramine which is then further purified prior to conversion to ammonium paratungstate.

BACKGROUND OF THE INVENTION

Tungsten concentrates are converted to sodium tungstate solution by digestion in sodium hydroxide or sodium carbonate or by pressure leaching with sodium hydroxide or sodium carbonate. Impurities such as silicon, arsenic, phosphorus, etc., are removed by precipitation as insoluble compounds and filtration. The resulting solids contain some tungsten which decreases the total efficiency of the process.

Addition of sodium hydrogen sulfide to the solution with a pH of at least about 8 causes the thio complexes to form. These impurities precipitate as the sulfides when the pH is adjusted to about 3.0 molybdenum is usualy the major impurity. Again, the resulting solids contain tungsten which lowered the efficiency.

Once the sodium tungstate solution has been purified, it can be converted to ammonium tungstate via a tungsten solvent extraction system. Ammonium tungstate is then converted to ammonium paratungstate which is the precurser of pure tungstic oxide, which can be reduced to tungsten metal.

Besides the loss of tungsten, the above purification processes result in production of waste sludges the disposal of which poses problem.

Therefore, a method for efficiently producing ammonium paratungstate without production of such sludges would be an advancement in the art.

SUMMARY OF THE INVENTION

In accordance with one aspect of this invention, there is provided a method for producing relatively pure ammonium paratungstate form an impure tungsten solution. The method involves first adding hexamethylenetetramine to the tungsten solution and adjusting the pH to from about 1.0 to about 2.0 with a mineral acid to form a first precipitate of a tungsten hexamethylenetetramine product, which is then separated from its mother liquor. The precipitate is then slurried in water and the pH adjusted to from about 7.0 to about 8.5 with ammonia to dissolve the precipitate. The resulting solution is then adjusted to pH of from about 1.0 to about 2.0 with a mineral acid to form a second precipitate of the tungsten hexamethylenetetramine product which is then separated from its mother liquor. The second precipitate is then slurried in a second ammoniacal solution having a concentration of from about 10% to about 20% by weight of ammonia, the solution supplying sufficient ammonia to form ammonium paratungstate which crystallizes out on evaporation of the slurry at from about 90° C. to about 100° C. The ammonium paratungstate is then separated from its mother liquor.

DETAILED DESCRIPTION OF THE INVENTION

For a better understanding of the present invention, together with other and further objects, advantages, and capabilities thereof, reference is made to the following disclosure and appended claims in connnection with the above description of some of the aspects of the invention.

By the method of this invention, relatively pure crystalline ammonium paratungstate is produced from an impure tungsten solution by first forming a tungsten hexamethylenetetramine product which is further purified before conversion to ammonium paratungstate. The product is one or more compounds of tungsten and hexamethylenetetramine.

The starting tungsten solution is generally an alkali metal tungstate solution. Most typically, the tungsten solution is sodium tungstate which is generally produced by sodium hydroxide or sodium carbonate digestion or pressure leaching of tungsten concentrates. The tungsten concentration in such solutions generally ranges from about 100 to about 250 grams per liter. Typical impurities are arsenic, silicon, tin, although other impurities such as molybdenum+phosphorous can also be present.

Generally from about 0.5 to about 1.0 moles of hexamethylenetetramine per mole of tungsten is added to the tungsten solution. This amount is sufficient to subsequently precipitate essentially all of the tungsten as a product of the hexamethylenetetramine and tungsten.

The resulting hexamethylenetetramine treated solution is then adjusted to a pH of from about 1.0 to about 2.0 with a mineral acid, preferably concentrated sulfuric acid. Preferably the pH adjusted solution is allowed to agitate for about 2 hours at less than about 20° C. to allow the formation of a first precipitate of the tungsten hexamethylenetetramine product and a first mother liquor. At pH values above about 7.0 (which is the condition of the hexamethylenetetramine treated solution) no precipitation takes place. At pH values between about 7.0 and about 5.0, precipitation occurs but the solids very slowly redissolve. Below a pH of about 5.0, the precipitation is permanent. Near complete precipitation of the tungsten is not seen until a pH of from about 1.0 to about 2.0 is reached.

The first precipitate is then separated from the first mother liquor by any standard technique such as filtration. This first precipitate is essentially pure with respect to sodium.

The first precipitate of the tungsten hexamethylenetetramine product is then further purified by dissolution and recrystallization as described below.

A first slurry is formed of the first precipitate and water. Generally the slurry is made up of from about 10 to about 20 parts of water per part of tungsten the hexamethylenetetramine product. Lesser amounts of water are insufficient to subsequent dissolve all the tungsten hexamethylenetetramine while greater amounts of water are uneconomical. In order for the tungsten hexamethylenetetramine product to dissolve, the pH must be adjusted to from about 7.0 to about 8.5. This is done by the addition of ammonia or ammonium hydroxide (aqueous ammonia) preferably dropwise to accomplish the dissolution and form a first ammoniacal solution of the tungsten hexamethylenetetramine complex.

The pH of the first ammoniacal solution is then adjusted to from about 1.0 to about 2.0 with a mineral acid to precipitate the tungsten hexamethylenetetramine product as a second precipitate leaving behind a second mother liquor in essentially the same manner as described for the first precipitate. Again essentially all of the tungsten is recovered in the second precipitate.

The second precipitate is then separated from the second mother liquor by any standard technique such as filtration.

A second ammoniacal solution is then formed of water and ammonia or ammonium hydroxide. The solution is generally made up of from about 10% to about 20% by weight of ammonia and the pH is from about 8.5 to about 10.0. To this solution is added the second precipitate to form a second slurry. Generally from about 10 to about 20 parts of solution are added per part of precipitate. This amount of ammonia contained herein is sufficient to subsequently form ammonium paratungstate.

The second slurry is then heated at from about 90° C. to about 100° C. and evaporated to a fraction, preferably about one third of its original volume. This step results in formation of a third precipitate which is essentially relatively pure crystalline ammonium paratungstate which contains the major portion of the tungsten and a third mother liquor which contains some tungsten and essentially all of the hexamethylenetetramine.

The third precipitate is separated from the third mother liquor by any standard technique such as filtration. The ammonium paratungstate product is at least about 99.9% pure.

The hexamethylenetetramine contained in the third mother liquor along with the tungsten contained therein can be recycled in the operation. Therefore there is esentially no significant loss of tungsten. There are essentially no waste sludges.

To more fully illustrate this invention, the following non-limiting example is presented. All parts, portions, and percentages are on a weight basis unless otherwise stated.

EXAMPLE

A sodium tungstate solution obtained from the caustic digestion of tungsten concentrates is the starting material. Analysis of the solution is as follows:

| grams per liter | W | As | Si | Sn |
|---|---|---|---|---|
| | 240 | 0.43 | 0.23 | 0.013 |

About 18.3 parts of hexamethylenetetramine is added to the solution which contains about 24 parts of tungsten, so that a mole ratio of hexamine to tungsten of about 0.5 is obtained. Concentrated sulfuric acid is then added dropwise until the pH of the mixture reaches about 1.5. The mixture is stirred for about 2 hours at less than about 20° C. and then filtered to recover the tungsten hexamethylenetetramine precipitate. The recovery of tungsten in this step is about 99.8%. The precipitate, about 50 parts is slurried in about 600 parts of water and the pH is adjusted to about 7.0 with ammonium hydroxide to completely dissolve the precipitate. Sulfuric acid is then added slowly to adjust the pH to about 1.5 and the mixture is stirred for about 2 hours below about 20° C. and then filtered to recover the second precipitate of tungsten hexamethylenetetramine. In this step at least about 99.7% of the tungstent which was slurried is recovered as the second precipitate. The second precipitate is then slurried in about 500 parts of water to which about 50 to 100 parts of concentrated ammonium hydroxide has been added. The solution is heated to about 90° C. to about 100° C. and the heating continues until the volume is reduced to about one third of its original volume to allow the precipitation of ammonium paratungstate. Analysis of the ammonium paratungstate is as follows:

| ppm | | | | | | | | | | | | |
|---|---|---|---|---|---|---|---|---|---|---|---|---|
| As | P | Al | Ca | Cu | Cr | Fe | Mg | Mn | Ni | Si | Sn | Mo |
| 5 | 7 | 5.6 | .42 | .2 | .7 | .7 | .4 | .7 | .7 | 3.6 | .7 | 135 |

A yield of about 72% is obtained.

While there has been shown and described what are at present considered the preferred embodiments of the invention, it will be obvious to those skilled in the art that various changes and modifications maybe made therein without departing from the scope of the invention as defined by the appended claims.

What is claimed is:

1. A method for producing relatively pure crystalline ammonium paratungstate from an impure tungsten solution, said method comprising:
    (a) adding hexamethylenetetramine to said tungsten solution in an amount sufficient to form a tungsten hexamethylenetetramine product;
    (b) adjusting the pH of the resulting hexamethylenetyetramine treated solution with a mineral acid to from about 1.0 to about 2.0 to form a first precipitate of said product containing essentially all of the tungsten and a first mother liquor;
    (c) separating said first precipitate from said first mother liquor;
    (d) forming a first slurry of said first precipitate in water and thereafter adjusting the pH of said first slurry to from about 7.0 to about 8.5 with ammonia to dissolve said first precipitate and form a first ammoniacal solution of the tungsten hexamethylenetetramine product;
    (e) adjusting the pH of said first ammoniacal solution to from about 1.0 to about 2.0 with a mineral acid to form a second precipitate of said product and a second mother liquor;
    (f) separating said second precipitate from said second mother liquor;
    (g) forming a second slurry of said second precipitate in a second ammoniacal solution said solution having a concentration of from about 10% to about 20% by weight of ammonia, said solution supplying sufficient ammonia to subsequently form ammonium paratungstate;
    (h) evaporating said second slurry at from about 90° C. to about 100° C. to a fraction of its original volume to form a third precipitate of relatively pure crystalline ammonium paratungstate and a third mother liquor containing essentially all of said hexamethylenetetramine; and
    (i) separating said third precipitate from said third mother liquor.

2. A method according to claim 1 wherein said tungsten solution is an alkali metal tungstate solution.

3. A method according to claim 2 wherein said tungsten solution is a sodium tungstate solution.

4. A method according to claim 1 wherein said mineral acid is sulfuric acid.

5. A method according to claim 1 wherein from about 1.5 to about 1.0 moles of hexamethylenetetramine per mole of tungsten is added to said tungsten solution.

6. A method according to claim 1 wherein said tungsten hexamethylenetetramine product is one or more compounds of tungsten and hexamethylenetetramine.

* * * * *